(12) United States Patent
Park et al.

(10) Patent No.: US 11,814,057 B2
(45) Date of Patent: Nov. 14, 2023

(54) METHOD AND DEVICE FOR CALCULATING RUNNING RESISTANCE OF VEHICLE

(71) Applicants: Hyundai Motor Company, Seoul (KR); Kia Corporation, Seoul (KR)

(72) Inventors: Jun Sung Park, Yongin-si (KR); Jaebin Lee, Yongin-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 113 days.

(21) Appl. No.: 17/453,509

(22) Filed: Nov. 4, 2021

(65) Prior Publication Data

US 2022/0363268 A1  Nov. 17, 2022

(30) Foreign Application Priority Data

May 13, 2021  (KR) .................... 10-2021-0062147

(51) Int. Cl.
*B60W 40/10* (2012.01)
*B60W 50/00* (2006.01)

(52) U.S. Cl.
CPC ........ *B60W 40/1005* (2013.01); *B60W 50/00* (2013.01); *B60W 2050/002* (2013.01); *B60W 2510/0638* (2013.01); *B60W 2510/0657* (2013.01); *B60W 2510/081* (2013.01); *B60W 2510/083* (2013.01); *B60W 2520/10* (2013.01); *B60W 2520/12* (2013.01); *B60W 2552/15* (2020.02); *B60W 2710/0666* (2013.01); *B60W 2710/083* (2013.01); *B60W 2710/10* (2013.01); *B60W 2720/10* (2013.01); *B60W 2720/12* (2013.01)

(58) Field of Classification Search
CPC ............. B60W 40/1005; B60W 50/00; B60W 2050/002; B60W 2510/0638; B60W 2510/0657; B60W 2510/081; B60W 2510/083; B60W 2520/10; B60W 2520/12; B60W 2552/15; B60W 2710/0666; B60W 2710/083; B60W 2710/10; B60W 2720/10; B60W 2720/12
USPC ................................................. 701/32.9, 84
See application file for complete search history.

(56) References Cited

U.S. PATENT DOCUMENTS

| 5,171,069 A * | 12/1992 | Peck ..................... B60T 8/1708 |
| | | 303/118.1 |
| 5,984,435 A * | 11/1999 | Tsukamoto ......... B60T 8/17636 |
| | | 303/191 |
| 2006/0231310 A1* | 10/2006 | Suzuki .................. B60T 8/1769 |
| | | 180/197 |

(Continued)

FOREIGN PATENT DOCUMENTS

JP  WO2014112038 A1 *  1/2017

*Primary Examiner* — Isaac G Smith
(74) *Attorney, Agent, or Firm* — MCDONNELL BOEHNEN HULBERT & BERGHOFF LLP

(57) ABSTRACT

A method for calculating running resistance of a vehicle includes: calculating, by a controller, an integrated value obtained by integrating a torque of a driving source of the vehicle before the vehicle reaches a reference speed after the vehicle starts; and calculating, by the controller, the running resistance of the vehicle including rolling resistance based on the integrated value of the torque of the driving source.

10 Claims, 2 Drawing Sheets

(56) References Cited

U.S. PATENT DOCUMENTS

2009/0064967 A1\* 3/2009 Shikawa ............. F02D 13/0226
                                                    701/111
2019/0283750 A1\* 9/2019 Bai ................... B60W 50/0097

\* cited by examiner

METHOD AND DEVICE FOR CALCULATING RUNNING RESISTANCE OF VEHICLE

CROSS-REFERENCE TO RELATED APPLICATIONS

This application claims priority to and the benefit of Korean Patent Application No. 10-2021-0062147 filed in the Korean Intellectual Property Office on May 13, 2021, the entire contents of which are incorporated herein by reference.

TECHNICAL FIELD

The present disclosure relates to a vehicle. More particularly, the present disclosure relates to a method and device for calculating running resistance of a vehicle.

BACKGROUND

In general, running resistance refers to a sum of individual resistances generated against running of a vehicle.

The running resistance includes rolling resistance, air resistance, and climbing resistance. The rolling resistance is resistance generated when vehicle's wheels roll on a road surface, the air resistance is resistance generated by a flow of air while a vehicle is running, and the climbing resistance is resistance generated by gravity when a vehicle climbs a slanted surface.

The running resistance is a necessary item to predict the performance of a vehicle, and such running resistance may be obtained by using a simulation or by measuring while the vehicle is actually running.

The above information disclosed in this Background section is only for enhancement of understanding of the background of the present disclosure and therefore it may contain information that does not form the prior art that is already known in this country to a person of ordinary skill in the art.

SUMMARY

The present disclosure has been made in an effort to provide a method and device for calculating running resistance of a vehicle having advantages of accurately and quickly calculating the running resistance of the vehicle until the vehicle reaches a reference speed (e.g., 18 (kph) or 20 (kph)) after the vehicle starts.

An exemplary embodiment of the present disclosure provides a method for calculating running resistance of a vehicle, including: calculating, by a controller, an integrated value obtained by integrating a torque of a driving source of the vehicle before the vehicle reaches a reference speed after the vehicle starts; and calculating, by the controller, the running resistance of the vehicle including rolling resistance based on the integrated value of the torque of the driving source.

The method for calculating running resistance of a vehicle may further include correcting, by the controller, the running resistance of the vehicle based on an arrival time when the vehicle reaches the reference speed, in which the controller may increase the running resistance of the vehicle when the time to reach the reference speed increases.

The method for calculating running resistance of a vehicle may further include: calculating, by the controller, the integrated value obtained by integrating an inclination angle of a road before the vehicle reaches the reference speed after the vehicle starts when there is the inclination angle of the road on which the vehicle runs; calculating, by the controller, the running resistance of the vehicle including gradient resistance based on the integrated value of the inclination angle of the road; and finally calculating, by the controller, the running resistance of the vehicle by adding the running resistance of the vehicle including the gradient resistance to the running resistance of the vehicle including the rolling resistance.

The method for calculating running resistance of a vehicle may further include: calculating, by the controller, the integrated value obtained by integrating the inclination angle of the road before the vehicle reaches the reference speed after the vehicle starts when there is the inclination angle of the road on which the vehicle runs; calculating, by the controller, the running resistance of the vehicle including gradient resistance based on the integrated value of the inclination angle of the road; and finally calculating, by the controller, the running resistance of the vehicle by adding the running resistance of the vehicle including the gradient resistance to the corrected running resistance of the vehicle.

The method for calculating running resistance of a vehicle may further include controlling, by the controller, the driving source or a transmission of the vehicle based on the running resistance of the vehicle.

Another embodiment of the present disclosure provides a method for calculating running resistance of a vehicle, including: calculating, by a controller, integrating a torque of a driving source of the vehicle before the vehicle reaches a reference speed after the vehicle starts, and calculating an average value of the integrated torque of the driving source; and calculating, by the controller, the running resistance of the vehicle including rolling resistance based on the average value of the torque of the driving source.

The method for calculating running resistance of a vehicle may further include correcting, by the controller, the running resistance of the vehicle based on an arrival time when the vehicle reaches the reference speed, in which the controller may increase the running resistance of the vehicle when the time to reach the reference speed increases.

The method for calculating running resistance of a vehicle may further include: integrating, by the controller, an inclination angle of a road before the vehicle reaches the reference speed after the vehicle starts when there is the inclination angle of the road on which the vehicle runs and calculating an average value of the integrated inclination angle of the road; calculating, by the controller, the running resistance of the vehicle including gradient resistance based on the average value of the inclination angle of the road; and finally calculating, by the controller, the running resistance of the vehicle by adding the running resistance of the vehicle including the gradient resistance to the running resistance of the vehicle including the rolling resistance.

The method for calculating running resistance of a vehicle may further include: integrating, by the controller, an inclination angle of a road before the vehicle reaches the reference speed after the vehicle starts when there is the inclination angle of the road on which the vehicle runs and calculating an average value of the integrated inclination angle of the road; calculating, by the controller, the running resistance of the vehicle including gradient resistance based on the average value of the inclination angle of the road; and finally calculating, by the controller, the running resistance of the vehicle by adding the running resistance of the vehicle including the gradient resistance to the corrected running resistance of the vehicle.

The method for calculating running resistance of a vehicle may further include controlling, by the controller, the driving source or a transmission of the vehicle based on the running resistance of the vehicle.

Yet another embodiment of the present disclosure provides a device for calculating running resistance of a vehicle, including: a driving source rotation speed sensor that detects a rotation speed of a driving source included in the vehicle; a vehicle speed sensor that detects a reference speed of the vehicle; and a controller that calculates an integrated value obtained by integrating a torque of a driving source of the vehicle before the vehicle reaches a reference speed detected by the vehicle speed sensor after the vehicle starts, in which the controller may calculate the torque of the driving source based on the rotation speed of the driving source detected by the driving source rotation speed sensor, and the controller may calculate the running resistance of the vehicle including rolling resistance based on the integrated value of the torque of the driving source.

The device for calculating running resistance of a vehicle may further include a timer that measures an arrival time when the vehicle reaches the reference speed, in which the controller may correct the running resistance of the vehicle based on the arrival time of the vehicle, and the controller may increase the running resistance of the vehicle when the time to reach the reference speed increases.

The device for calculating running resistance of a vehicle may further include an inclination angle sensor that detects an inclination angle of a road on which the vehicle runs, in which the controller may calculate the integrated value obtained by integrating the inclination angle of the road before the vehicle reaches the reference speed after the vehicle starts when there is the inclination angle of the road detected by the inclination angle sensor, the controller may calculate the running resistance of the vehicle including gradient resistance based on the integrated value of the inclination angle of the road, and the controller may finally calculate the running resistance of the vehicle by adding the running resistance of the vehicle including the gradient resistance to the running resistance of the vehicle including the rolling resistance.

The device for calculating running resistance of a vehicle may further include an inclination angle sensor that detects an inclination angle of a road on which the vehicle runs, in which the controller may calculate the integrated value obtained by integrating the inclination angle of the road before the vehicle reaches the reference speed after the vehicle starts when there is the inclination angle of the road detected by the inclination angle sensor, the controller may calculate the running resistance of the vehicle including gradient resistance based on the integrated value of the inclination angle of the road, and the controller may finally calculate the running resistance of the vehicle by adding the running resistance of the vehicle including the gradient resistance to the corrected running resistance of the vehicle.

The controller may control the driving source or a transmission of the vehicle based on the running resistance of the vehicle.

According to an embodiment of the present disclosure, a method and device for calculating running resistance of a vehicle may accurately and quickly calculate running resistance of a vehicle in real time until the vehicle reaches a reference speed after the vehicle starts.

BRIEF DESCRIPTION OF THE DRAWINGS

A brief description of the drawings will be provided in order to allow the drawings used in a detailed description of the present disclosure to be sufficiently understood.

DETAILED DESCRIPTION

Figure 1:
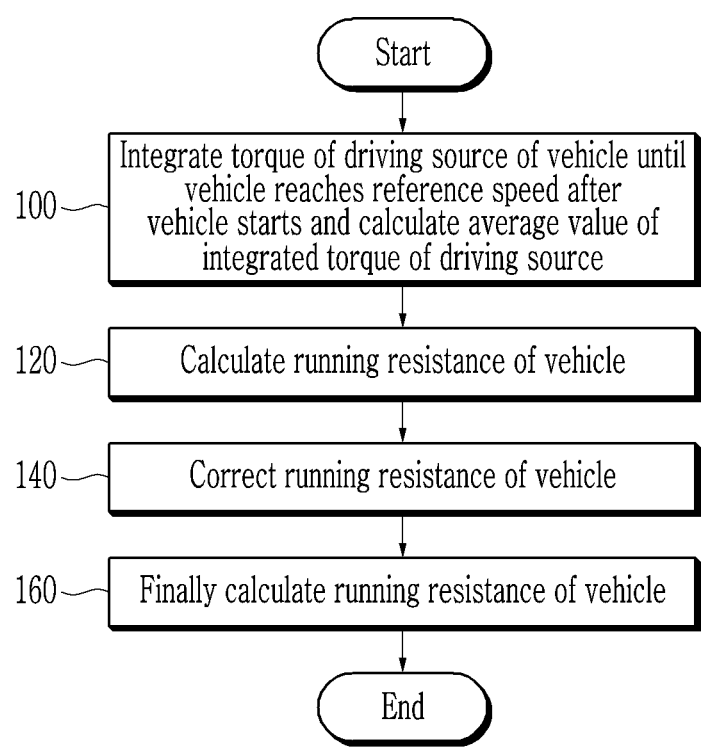
FIG. 1 is a flowchart illustrating a method for calculating running resistance of a vehicle according to an embodiment of the present disclosure.

In order to sufficiently understand the present disclosure and objects accomplished by executing the present disclosure, reference should be made to the accompanying drawings illustrating exemplary embodiments of the present disclosure and contents described in the accompanying drawings.

Hereinafter, the present disclosure will be described in detail by describing exemplary embodiments of the present disclosure with reference to the accompanying drawings. In describing the present disclosure, well-known configurations or functions will not be described in detail since they may unnecessarily obscure the gist of the present disclosure. Throughout the drawings, the same reference numerals will denote the same components.

Terms used in the present specification are used only in order to describe specific exemplary embodiments rather than limiting the present disclosure. Singular forms are to include plural forms unless the context clearly indicates otherwise. It will be further understood that the terms "include" or "have" used in the present specification, specify the presence of features, numerals, steps, operations, components, parts mentioned in the present specification, or a combination thereof, but do not preclude the presence or addition of one or more other features, numerals, steps, operations, components, parts, or a combination thereof.

Throughout the present specification, when any one portion is referred to as being "connected to" another portion, it means that any one portion and another portion are "directly connected to" each other or are "electrically or mechanically connected to" each other with the other component interposed therebetween.

Unless being defined otherwise, the terms used in the present specification including technical and scientific terms have the same meanings as those that are generally understood by a person of ordinary skill in the art. It should be understood that the terms defined by the dictionary are identical with the meanings within the context of the related art, and they should not be ideally or excessively formally defined unless the context clearly dictates otherwise.

A method for calculating running resistance of a vehicle equipped with a trailer according to the related art calculates the running resistance of the vehicle using a weight of the vehicle according to a physical theoretical formula, so it is not possible to accurately and quickly calculate the running resistance of the vehicle in real time. Factors of the physical theoretical formula include an inclination angle (inclination angle of a vehicle) of a road on which the vehicle runs and an acceleration) of the vehicle speed over time, which makes the running resistance of the vehicle inaccurate. Therefore, when the inclination angle approaches 0 and the acceleration approaches 0, a denominator of the physical theoretical formula approaches (converges) 0, and the weight of the vehicle according to the physical theoretical formula becomes infinite, so the weight of the vehicle cannot be calculated.

Figure 2:
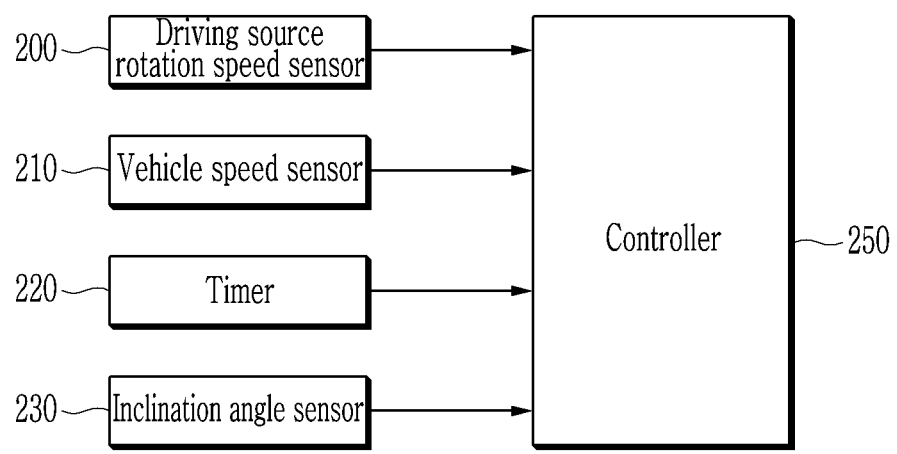
FIG. 2 is a diagram for describing a device for calculating running resistance of a vehicle to which the method for calculating running resistance of the vehicle illustrated in FIG. 1 is applied.

FIG. 1 is a flowchart illustrating a method for calculating running resistance of a vehicle according to an embodiment of the present disclosure. FIG. 2 is a block diagram for describing a device for calculating running resistance of a vehicle to which the method for calculating running resistance of a vehicle illustrated in FIG. 1 is applied.

Referring to FIGS. 1 and 2, in a calculating step 100, a controller 250 may integrate (perform integral operation with respect to time) a torque of a driving source (or power source) such as an engine or an electric motor driving a vehicle (e.g., a vehicle having a towed object (e.g., a trailer)) until the vehicle reaches a reference speed (e.g., 18 (kph) or 20 (kph)) after the vehicle starts, and calculate an average value of the integrated torque of the driving source. The controller 250 may calculate the torque of the driving source based on a rotation speed of the driving source that is detected by the driving source rotation speed sensor 200 and provided to the controller. In another embodiment of the present disclosure, the controller 250 may calculate an integrated value of the torque of the driving source that drives the vehicle until the vehicle reaches the reference speed (e.g., 18 (kph) or 20 (kph)) after the vehicle starts The device for calculating running resistance of a vehicle includes a driving source rotation speed sensor 200 that detects the rotation speed of the driving source of the vehicle, a vehicle speed sensor 210 that detects the reference speed of the vehicle, a timer 220 that measures a time when the vehicle reaches the reference speed, an inclination angle sensor 230, such as a gravity sensor (G sensor) or an acceleration sensor, that detects an inclination angle of a road on which the vehicle runs, and the controller 250.

The controller 250 is an electronic control unit (ECU) and may control the overall operation of the device for calculating running resistance of a vehicle. The instruction may be stored in a memory of the device for calculating running resistance of a vehicle or the controller 250.

According to step 120, the controller 250 may primarily calculate (or estimate) the running resistance of the vehicle based on the average value of the torque of the driving source. In another embodiment of the present disclosure, the controller 250 may primarily calculate (or estimate) the running resistance of the vehicle based on the integrated value of the torque of the driving source.

The running resistance of the vehicle according to the average value of the torque of the driving source or the integrated value of the torque of the driving source may be stored in the memory of the device for calculating running resistance of a vehicle or the controller 250 and may be determined by a test (or experiment). Since the vehicle runs less than or equal to the reference speed, the running resistance of the vehicle may not include air resistance, but include rolling resistance. The running resistance of the vehicle may be used to control the driving source and transmission of the vehicle. For example, when the running resistance of the vehicle is relatively large (when the running resistance of the vehicle is greater than the reference resistance), the controller 250 may control the driving source to have a relatively large output or torque (control the driving source to have an output greater than the reference output or a torque greater than the reference torque) or control a shift gear of the transmission transmitting the output of the driving source to be a lower gear.

According to step 140, the controller 250 may correct the running resistance of the vehicle based on the time when the vehicle reaches the reference speed. For example, the controller 250 may increase the running resistance of the vehicle when the time to reach the reference speed increases. The weight of the vehicle may increase when the time to reach the reference speed increases. The running resistance value of the vehicle, which increases according to the time to reach the reference speed, may be determined by a test (or experiment) and stored in the memory of the device for calculating running resistance of a vehicle or the controller 250.

According to step 160, when there is the inclination angle of the road on which the vehicle runs, the controller 250 may integrate the inclination angle of the road (or the inclination angle of the vehicle) until the vehicle reaches the reference speed after the vehicle starts and calculate the integrated average value of the inclination angle of the road. In another exemplary embodiment of the present disclosure, when there is the inclination angle of the road on which the vehicle runs, the controller 250 may calculate an integrated value obtained by integrating the inclination angle of the road (or the inclination angle of the vehicle) until the vehicle reaches the reference speed after the vehicle starts.

The controller 250 may calculate the running resistance of the vehicle including the gradient resistance (or climbing resistance) based on the average value of the inclination angle of the road. In another embodiment of the present disclosure, the controller 250 may calculate the running resistance of the vehicle including the gradient resistance (or climbing resistance) based on the integrated value of the inclination angle of the road.

The gradient resistance may have the weight information of the vehicle included in the running resistance of the vehicle primarily calculated in step 120. The running resistance of the vehicle according to the average value of the inclination angle of the road or the integrated value of the inclination angle of the road may be stored in the memory of the device for calculating running resistance of a vehicle or the controller 250 and may be determined by a test (or experiment). The controller 250 may finally calculate the running resistance of the vehicle by adding the running resistance of the vehicle including the gradient resistance to the running resistance of the vehicle including the rolling resistance. In another embodiment of the present disclosure, the controller 250 may finally calculate the running resistance of the vehicle by adding the running resistance of the vehicle including the gradient resistance to the corrected running resistance of the vehicle. The running resistance of the vehicle may be used to control the driving source or transmission of the vehicle.

Components, "~ units", blocks, or modules used in an exemplary embodiment of the present disclosure may be implemented by software such as tasks, classes, sub-routines, processes, objects, execution threads, or programs performed in a predetermined region on a memory or hardware such as a field-programmable gate array (FPGA) or an application-specific integrated circuit (ASIC) and may be implemented by a combination of the software and the hardware. The components, the "~ units", or the like, may be included in a computer readable storage medium or may be partially dispersed and distributed in a plurality of computers.

Hereinabove, exemplary embodiments have been disclosed in the drawings and the specification. Specific terms have been used in the present specification, but these specific terms are used only in order to describe the present disclosure and are not used in order to limit the meaning or limit the scope of the present disclosure as disclosed in the claims. Therefore, a person of ordinary skill in the art will understand that various modifications and equivalent exemplary embodiments are possible from the present disclosure.

Therefore, an actual technical protection scope of the present disclosure is to be defined by the technical spirit of the claims.

What is claimed is:

1. A method for calculating running resistance of a vehicle, comprising:
    comparing, by a controller, a speed of the vehicle to a reference speed after the vehicle starts;
    in response to a determination that the speed of the vehicle is greater than zero but less than the reference speed, calculating, by the controller, an integrated value obtained by integrating a torque of a driving source of the vehicle before the vehicle;
    calculating, by the controller, the running resistance of the vehicle including rolling resistance based on the integrated value of the torque of the driving source; and
    controlling, by the controlling, a shift gear of a transmission of the vehicle based on the running resistance of the vehicle.

2. The method of claim 1, further comprising:
    in response to a determination that the speed of the vehicle is equal to or greater than the reference speed, correcting, by the controller, the running resistance of the vehicle based on time to reach the reference speed,
    wherein the controller increases the running resistance of the vehicle when the time to reach the reference speed increases.

3. The method of claim 1, further comprising:
    in response to a determination that the speed of the vehicle is greater than zero but less than the reference speed, calculating, by the controller, an integrated value obtained by integrating an inclination angle of a road;
    calculating, by the controller, the running resistance of the vehicle including gradient resistance based on the integrated value of the inclination angle of the road; and
    finally calculating, by the controller, the running resistance of the vehicle by adding the running resistance of the vehicle including the gradient resistance to the running resistance of the vehicle including the rolling resistance.

4. The method of claim 2, further comprising:
    in response to a determination that the speed of the vehicle is greater than zero but less than the reference speed, calculating, by the controller, an integrated value obtained by integrating an inclination angle of a road;
    calculating, by the controller, the running resistance of the vehicle including gradient resistance based on the integrated value of the inclination angle of the road; and
    finally calculating, by the controller, the running resistance of the vehicle by adding the running resistance of the vehicle including the gradient resistance to the corrected running resistance of the vehicle.

5. The method of claim 1, further comprising:
    controlling, by the controller, the driving source of the vehicle based on the running resistance of the vehicle.

6. A device for calculating running resistance of a vehicle, comprising:
    a driving source rotation speed sensor that detects a rotation speed of a driving source included in the vehicle;
    a vehicle speed sensor; and
    a controller that compares a speed of the vehicle detected by the vehicle speed sensor to a reference speed after the vehicle starts,
    wherein, in response to a determination that the speed of the vehicle is greater than zero but less than the reference speed, the controller calculates an integrated value obtained by integrating a torque of a driving source of the vehicle,
    wherein the controller calculates the torque of the driving source based on the rotation speed of the driving source detected by the driving source rotation speed sensor,
    wherein the controller calculates the running resistance of the vehicle including rolling resistance based on the integrated value of the torque of the driving source, and
    wherein the controller controls a shift gear of a transmission of the vehicle based on the running resistance of the vehicle.

7. The device of claim 6, further comprising:
    a timer that measures an arrival time when the vehicle reaches the reference speed,
    wherein the controller receives the measured arrival time from the timer,
    wherein the controller corrects the running resistance of the vehicle based on the arrival time of the vehicle, and
    wherein the controller increases the running resistance of the vehicle when the time to reach the reference speed increases.

8. The device of claim 6, further comprising:
    an inclination angle sensor that detects an inclination angle of a road on which the vehicle runs,
    wherein, in response to a determination that the speed of the vehicle is greater than zero but less than the reference speed, the controller calculates the integrated value obtained by integrating the inclination angle of the road detected by the inclination angle sensor,
    the controller calculates the running resistance of the vehicle including gradient resistance based on the integrated value of the inclination angle of the road, and
    the controller finally calculates the running resistance of the vehicle by adding the running resistance of the vehicle including the gradient resistance to the running resistance of the vehicle including the rolling resistance.

9. The device of claim 7, further comprising:
    an inclination angle sensor that detects an inclination angle of a road on which the vehicle runs,
    wherein, in response to a determination that the speed of the vehicle is greater than zero but less than the reference speed, the controller calculates the integrated value obtained by integrating the inclination angle of the road detected by the inclination angle sensor,
    the controller calculates the running resistance of the vehicle including gradient resistance based on the integrated value of the inclination angle of the road, and
    the controller finally calculates the running resistance of the vehicle by adding the running resistance of the vehicle including the gradient resistance to the corrected running resistance of the vehicle.

10. The device of claim 6, wherein:
    the controller controls the driving source of the vehicle based on the running resistance of the vehicle.

* * * * *